3,318,948
PROCESS FOR INCREASING POLYMERIZATION ACTIVITY OF VINYL ACETATE

James H. Burgess, Calvert City, Ky., assignor to Air Reduction Company, Incorporated, New York, N.Y., a corporation of New York
No Drawing. Filed Mar. 12, 1964, Ser. No. 351,554
3 Claims. (Cl. 260—499)

This invention relates to the treatment of vinyl acetate prepared by reacting acetylene with acetic acid in the vapor phase in the presence of a catalyst, to increase and improve the polymerization activity of the vinyl acetate so produced.

The preparation of vinyl acetate from acetylene and acetic acid is a well-known procedure described, for example, in Baum et al. U.S. Patent 1,666,482, and various improved systems for the commercial preparation of vinyl acetate have been described in the patent literature, e.g. Gehrke U.S. Patent 2,485,044 and Stanton et al. U.S. Patent 2,794,827.

Vinyl acetate is a very useful compound for the production of polymers and thermoplastic materials possessing numerous desirable properties. The resulting polymers are useful for a variety of purposes, such as in the formation of emulsion paints, films, coating compositions, chewing gum bases, molding resins, adhesives, copolymers, and the like, as is well known to those skilled in the art.

Generally, the commercial preparation of vinyl acetate by reacting acetylene with acetic acid in the vapor phase in the presence of a catalyst, such as described in the above-noted patents, produces vinyl acetate monomer possessing variable polymerization activity, even though the proportions and reaction conditions are maintained an nearly identical as possible. In some instances, a major portion of the vinyl acetate monomer produced possesses acceptable polymerization activity while in other cases very little, or substantially none, of the vinyl acetate monomer produced possesses acceptable polymerization activity. The degree of polymerization activity which will be possessed by a particular vinyl acetate monomer is unpredictable. In those cases where the vinyl acetate monomer possesses acceptable polymerization activity, there is generally some monomer produced during the reaction which does not possess acceptable polymerization activity. This variation in polymerization activity not only results from variations in the synthesis reaction as carried out commerically, but it also results from the formation of polymerization inhibitors during the reaction, which formation may vary with different supplies of acetylene and/or acetic acid, and from the presence of inhibitors which may be added to prevent undesired polymerization of the vinyl acetate during its normal processing to recover it from the reaction mixture, e.g. by distillation.

In any case, the lack of desired polymerization activity or the variations in polymerization activity encountered in commercially-produced vinyl acetate is a serious problem and either a lower than desired polymerization activity has been tolerated, or complex, expensive, and time-consuming purification procedures have been resorted to in order to increase the polymerization activity to the desired value.

It is an object of this invention to provide a process for effectively increasing and improving the polymerization activity of vinyl acetate.

It is a further object of the invention to provide a process of the character indicated which can readily be combined with known commercial vinyl acetate production facilities to make possible the preparation of vinyl acetate having a uniform and high polymerization activity.

It is a still further object of the invention to provide a process for the treatment of vinyl acetate monomer generally to increase its polymerization activity to commercially acceptable standards and also further to improve the polymerization activity of the vinyl acetate monomer which posses a sufficient polymerization activity for commerical use.

In accordance with the invention, these and other objects are achieved by treating the vinyl acetate, after it has been distilled to free it from the usual contaminants, with a body of activated carbon. The treatment with activated carbon can be effected in the vapor phase, i.e. by treating the vinyl acetate as it comes from the final distillation step without prior condensation, or by separately vaporizing the vinyl acetate after it has been condensed, but preferably the treatment in accordance with the invention is effected with the vinyl acetate in the liquid phase, i.e. after the vinyl acetate has been condensed from the final distillation operation.

It is known that activated carbon has been used for many purification purposes, but it is unexpected that activated carbon when brought specifically into contact with vinyl acetate selectively increases the polymerization activity of the monomer. It has been found that the action of the activated carbon apparently involves much more than adsorption of naturally present or added inhibitors which adversely effect the polymerization activity of the vinyl acetate, and it is believed that some molecular rearrangement, condensation, or other action is induced, apparently catalytically. It has been found that even after prolonged use of a given body of activated carbon to treat vinyl acetate, to produce a product having an exceptionally high and desirable polymerization activity, the activity of the activated carbon is not diminished and regeneration of the activated carbon is not necessary. There appears to be, therefore, no contamination or deactivation of the activated carbon, which is contrary to the usual experience when activated carbon functions strictly as an adsorption agent, for example in the treatment of sugar, water, and like materials.

A feature of the process of this invention is that the activated carbon acts upon the vinyl acetate very rapidly, in contrast to the time-consuming procedures heretofore known. Furthermore, because prolonged treatment with a given body of activated carbon is possible without noticeable deactivation of the activated carbon, the process of this invention has important economic advantages over treating processes wherein substantial quantities of treating agents are continuously consumed per pound of vinyl acetate treated.

In a typical commercial preparation of vinyl acetate such as shown in the above-mentioned patents, the vapor-phase reaction between the acetic acid and acetylene is carried out by using an apparatus consisting of a suitably-heated vaporizer unit for effecting the vaporization of the acetic acid being reacted and a suitably heated reactor vessel packed with a suitable vapor-phase reaction catalyst. The reactants are fed into the vaporizer unit under pressure and fed through the reactor vessel which contains sufficient catalyst to complete the desired reaction. The resulting reaction product vapors are then passed to a condenser in which they are condensed and then to a receiver. The reaction product is then fractionally distilled in one or more distillation steps and the final vinyl acetate fraction is condensed and collected. Various portions of the vinyl acetate monomer so produced can be collected from the final condenser or received and tested for polymerization activity. In this manner the portions of the vinyl acetate monomer produced which possess acceptable polymerization activity can be eliminated. However, it has been found that it is advantageous to treat the entire vinyl acetate monomer production with the activated carbon since the treatment will not only increase the polymerization activity of the vinyl acetate monomer which did not meet the specifications but will also improve the polymerization activity of the vinyl acetate monomer which initially met the polymerization activity specifications.

The particular test employed to determine the degree of vinyl acetate monomer polymerization activity will depend to some extent upon the activity desired, and the like, but mostly upon the degree of activity which is commercially acceptable and advantageous to the ultimate user. Generally, the polymerization activity of any vinyl acetate monomer can be accurately determined by a well-known test method involving polymerization of the monomer under set or standardized polymerization conditions.

In this test known amounts of water (150 ml.), polyvinyl alcohol (0.15 g.), vinyl acetate monomer (150 g.) and benzoyl peroxide (0.15 g.) as polymerization catalyst, are heated under vigorous agitation. At the first sign of reflux (150° F. in the case of vinyl acetate), the time is recorded. A steady reflux is then maintained until the batch temperature rises to 167° F., when the time is again recorded. The period from start of reflux until the final temperature, i.e. 167° F., is attained is the activity time, and should not exceed 170. This test procedure is described in detail on pp. 15 et seq. in the publication entitled "Vinyl Acetate Monomer" published in 1961 by the Air Reduction Chemical and Carbide Company.

Activated carbon is a well-known product and is described, for example, on page 21 of "The Condensed Chemical Dictionary," 5th edition, published in 1956 by Reinhold Publishing Company, and in "Active Carbon—The Modern Purifier" by John W. Hassler, published by the West Virginia Pulp and Paper Company. Activated carbon is sold commercially in various grades and sizes which are particularly adapted for various known uses. The activated carbon which is most advantageously used in carrying out the process of this invention, when the process is carried out in the liquid phase, is of the type produced for cane-sugar refining, one commercial form of which is known as type "CAL" sold by the Pittsburgh Chemical Company. When the process is carried out in the vapor phase, type "BPL" is most advantageously used. Activated carbon of this type is particularly designed for use in solvent recovery operations.

Activated carbons are supplied in various particle sizes and, for the purposes of this invention, granular rather than powdered activated carbon is employed, preferably in a fixed bed, through which the vinyl acetate to be purified is continuously passed. A particularly effective size of activated carbon is 12 x 40 mesh of the U.S. sieve series.

In treating vinyl acetate in the liquid phase in accordance with this invention, the monomer is passed continuously through the bed of activated carbon at ambient temperature, e.g. room temperature, and no heating of the monomer is required. If the monomer should happen to be at a temperature above ambient temperature, it can be treated at this higher temperature but no particular advantage results. In other words, the monomer can be at any temperature as long as it is below its boiling point.

When the monomer is to be treated in the vapor phase, which is less preferable than the liquid phase for the purposes of this invention, it is, of course, vaporized and the treating zone containing the activated carbon is heated so that the monomer will remain in the vapor phase and will not condense in the treating zone. The temperature to which the monomer is heated to keep it in vapor form in the vapor-phase treatment will, of course, depend upon its boiling point and will be readily determinable by a person skilled in the art by routine means. After the vinyl acetate has been treated in the vapor phase it is suitably condensed by any conventional condensing means.

As previously mentioned, one of the features of this invention is that the activity of the activated carbon in relation to increasing the polymerization activity of vinyl acetate is such that exceedingly large quantities of vinyl acetate can be treated with a given volume of activated carbon without loss of activity by the carbon or need for reactivation of the carbon. No specific minimum quantity of activated carbon per pound of vinyl acetate can be specified, because experience has shown that as little as 0.0001 lb. of activated carbon per pound of vinyl acetate is effective, and apparently even lesser quantities are also effective. However, from a practical standpoint, a bed of activated carbon has to be provided and the vinyl acetate passed through this bed. In practice, for example, a bed consisting of 115.5 cubic feet of 12 x 40 mesh activated carbon, e.g. type CAL, is utilized and the vinyl acetate is passed through this bed at the rate of 100 pounds per minute. Most advantageously, the bed of activated carbon has a dimension in the direction of flow of the vinyl acetate which is greater than its dimension normal to the direction of flow, but beds having a depth less than their transverse dimension can also be used. For example, beds can have a lengthwise dimension which is ½ to 50 times their transverse dimension. A smaller or larger bed can be utilized, but generally beds having a minimum depth of three feet with a maximum flow rate of 1.3 gallons per minute per square foot of surface area of the activated carbon are most advantageously used from a practical standpoint, and a practical minimum flow rate is 0.1 gallon per minute per square foot. In general, the rate of flow of vinyl acetate through the bed is most suitably ½ to 6000 pounds per hour, and a standard reference bed has a diameter of 42 inches and a longitudinal dimension of 12 feet. Once the bed has been established, it has been found that, surprisingly, many pounds of vinyl acetate can be passed through the bed to effect the desired improvement in the polymerization activity of the vinyl acetate with no apparent adverse effect upon the activity of the activated carbon. For example, in actual practice, 30 million pounds of vinyl acetate have been passed through a bed consisting of 3300 lbs. (115.5 cubic feet) of activated carbon and the improvement in the polymerization rate of the last pound of vinyl acetate is substantially as great as the improvement in the polymerization activity of the first pound of vinyl acetate passed through this bed in the liquid phase at ambient temperature.

As mentioned above, the process of this invention is adapted to be combined with any conventional vapor-phase synthesis of vinyl acetate, such as described in the above-mentioned patents and no special equipment is required. The bed of activated carbon can be contained in a tank of suitable dimensions with the activated carbon preferably supported upon a screen in the tank and the tank being not completely filled so that a small space exists in the tank, both above and below the bed of activated carbon. In the case of both liquid and vapor-phase treatment, the liquid or vaporized vinyl acetate is preferably passed downwardly through the bed of activated carbon and the connection to existing equipment, e.g. the vinyl acetate condenser following the distillation step, or the vinyl acetate vaporizer or distillation unit, is by conventional piping, and the outlet of the activated carbon treating tank is likewise connected by conventional piping to a condenser, in the case of vapor treatment, or a receiver in the case of liquid treatment.

The objects and features of the invention will be further apparent from the following specific examples of practical application.

In the following examples the vinyl acetate treated was produced by the vapor-phase reaction between acetylene and acetic acid, by known procedures; thus, in accordance with known vinylation procedures.

The reaction temperature can be varied quite widely as is well known to those skilled in the art. Reaction temperatures between 175 and 250° C., preferably 200 to 220° C., have been found to be quite satisfactory in most instances, although both higher and lower temperatures can be used.

Various mol ratios of acetylene to acetic acid can be used. A molar ratio of acetylene to acetic acid of 6:1 is advantageous. The most appropriate acetylene-acetic acid mol ratios which can be used can be readily determined by those skilled in the art by routine means.

Various reaction catalysts can be used to promote the vapor-phase reaction between the acetylene and the acetic acid, including zinc acetate absorbed on or impregnated in charcoal or alumina. Various other catalysts can be used which are disclosed in prior art as will be understood by those skilled in the art. The use of charcoal as a carrier with zinc acetate is the common catalyst.

As previously mentioned, typical vinylation procedures are described in Gehrke U.S. Patent 2,485,044 and Stanton et al. U.S. Patent 2,794,827.

In the examples, the vinyl acetate has been recovered from the reaction mixture by fractional distillation as described, for example, in the Gehrke patent.

*Example 1*

Vinyl acetate at a temperature of 24° C. was passed at the rate of 20 ml. per minute longitudinally through a fixed bed of type CAL activated carbon of 12 x 40 mesh, the bed being a cylindrical body having a diameter of 1.125 inches and a longitudinal dimension of 14 inches, and the effluent treated vinyl acetate was collected. Before passage through the bed of activated carbon, the vinyl acetate was tested for polymerization activity and was found to have an activity of 160 minutes. The vinyl acetate was again tested for polymerization activity after passage through the bed and was found to have an activity of 123 minutes. The vinyl acetate before treatment had an unsatisfactory polymerization activity, but the vinyl acetate after treatment had a polymerization activity well surpassing commercial requirements.

*Example 2*

Another portion of the vinyl acetate was vaporized and heated to a temperature of 72° C. and then passed through a bed of type BPL activated carbon of 4 x 10 mesh maintained at a temperature of 72° C. The bed of activated carbon was 24 inches deep and had a diameter of 0.6875 inch. The vinyl acetate vapors were passed for 1 hour through the bed at the rate of 0.55 lb. per hour.

The vapors issuing from the activated carbon bed were condensed and measured for polymerization activity as described in Example 1. As in the case of the treated product of Example 1, the treated condensed vinyl acetate had a polymerization activity well exceeding commercial requirements. The activity before the treatment with activated carbon was 121 minutes and after the treatment with activated carbon the polymerization activity was 108 minutes.

It will be understood that various changes and modifications may be made in the foregoing description without departing from the scope of the invention, as defined in the appended claims and it is intended, therefore, that all matter contained in the foregoing description shall be interpreted as illustrative only and not as limitative of the invention.

I claim:
1. A process of treating vinyl acetate monomer produced by the vapor-phase synthesis of said monomer from acetylene and acetic acid, wherein the reaction mixture from said synthesis is distilled to separate the vinyl acetate monomer therefrom, to increase the polymerization activity of said monomer which comprises passing said monomer after it has been so separated by distillation through a bed of granular activated carbon.

2. A process of treating vinyl acetate monomer produced by the vapor-phase synthesis of said monomer from acetylene and acetic acid, wherein the reaction mixture from said synthesis is distilled to separate the vinyl acetate monomer therefrom, to increase the polymerization activity of said monomer which comprises passing said monomer after it has been so separated by distillation through a bed of granular activated carbon, the contact of said monomer with said bed corresponding to the passage of a maximum of 1.3 gallons per minute of said monomer per square foot of surface area of the activated carbon through a bed of activated carbon having a minimum depth of three feet.

3. A process of treating vinyl acetate monomer produced by the vapor-phase synthesis of said monomer from acetylene and acetic acid, wherein the reaction mixture from said synthesis is distilled to separate the vinyl acetate monomer therefrom, to increase the polymerization activity of said monomer which comprises passing said monomer after it has been so separated by distillation through a bed of granular activated carbon, the contact of said monomer with said bed corresponding to the passage of ½ to 6000 pounds per hour of said monomer through a bed of activated carbon having a diameter of 42 inches and a longitudinal dimension of 12 feet.

References Cited by the Examiner

UNITED STATES PATENTS

| 1,666,482 | 4/1928 | Baum et al. | 260—498 |
| 2,992,246 | 7/1961 | Frantz | 260—498 |

FOREIGN PATENTS

| 1,123,661 | 2/1962 | Germany. |

LORRAINE A. WEINBERGER, *Primary Examiner.*

VIVIAN GARNER, *Assistant Examiner.*